Dec. 20, 1960 W. A. BEDFORD, JR 2,965,812

ELECTRICAL CONNECTOR

Filed Jan. 16, 1958

INVENTOR:
WILLIAM A. BEDFORD JR.,
BY Walter S. Jones
ATTORNEY.

United States Patent Office 2,965,812

Patented Dec. 20, 1960

2,965,812

ELECTRICAL CONNECTOR

William A. Bedford, Jr., North Scituate, Mass., assignor to United-Carr Fastener Corporation, Cambridge, Mass., a corporation of Delaware Filed Jan. 16, 1958, Ser. No. 709,293

1 Claim. (Cl. 317—101)

This invention relates generally to fastening strips and has particular reference to fastening strips for connecting electronic components or the like to a panel.

Since the advent of the printed circuit boards in the electronic industry, it has been the practice to insert the various components through the panel using holes drilled therein and inserting the component leads therethrough and dip soldering the lower surface of the board. However, due to rapid changes in the development of industrial electronics, substitutions of components or entire series of components are frequently necessary requiring a complete revision of the printed circuit board. This has proved expensive both in time and labor and there exists a need in the industry for a grouped component system having the advantages of a printed circuit yet readily allowing for changes and substitutions of components.

With this purpose in view, the object of this invention is to provide a circuit connector strip adapted to connect electronic components such as resistors, capacitors or the like to a panel.

Another object of this invention is to provide a circuit connector strip comprising a series of wire retaining openings which are spaced from each other a standard distance.

A further object of this invention is to provide a fastener strip of the kind described which may be stored in reel form and cut to pre-determined lengths.

Other objects of the invention will, in part, be obvious, and will, in part, appear hereinafter.

Figure 1:
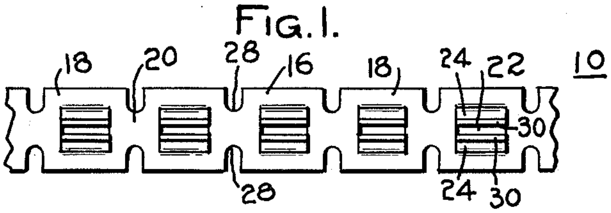
Fig. 1 is a bottom plan view of the connector strip.
Figure 2:
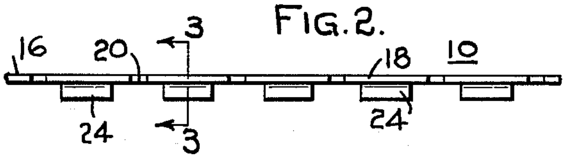
Fig. 2 is a view in elevation of the connector strip.
Figure 3:
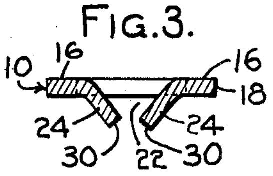
Fig. 3 is a view in section, taken on line 3—3 of Fig. 2.

Referring to the drawing, there is illustrated a circuit connector 10 which is adapted for securing electronic components 12 to a panel 14. The connector 10 comprises a strip of metal 16 having rectangular sections 18 forming a linear series of individual connectors attached to each other by web portions 20. A wire receiving aperture 22 is stuck out of the rectangular sections 18 having downwardly extending tongues 24 adapted to grip the terminal leads 26 of the electronic components. Notches 28 are formed on the webs 20 to aid in cutting off predetermined lengths of connectors.

Figure 4:
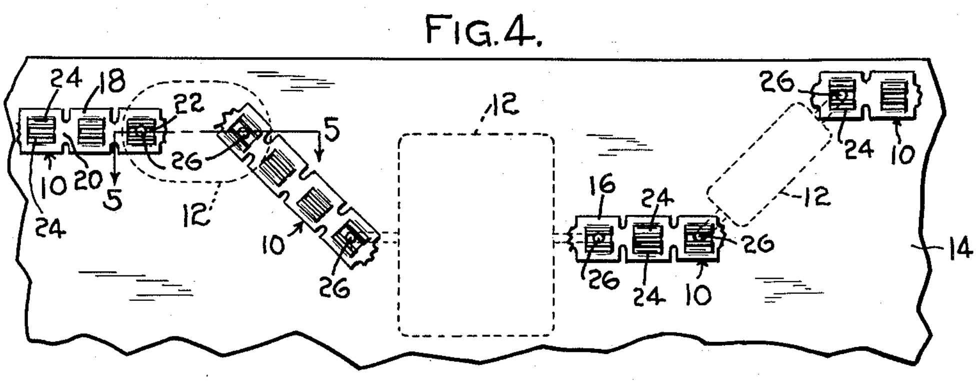
Fig. 4 is a bottom plan view of a panel showing the connector strip circuiting the units.
Figure 5:
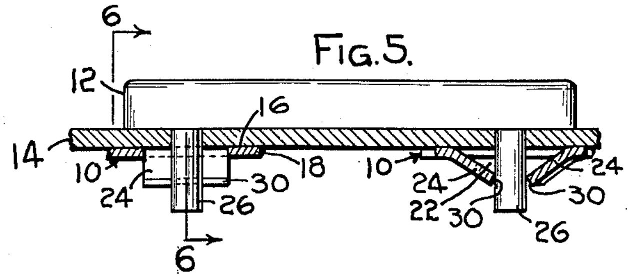
Fig. 5 is an enlarged sectional view of a portion of the panel taken on the line 5—5.

The panel 14 comprises a phenolic board having holes at predetermined intervals and spaced from each other a distance to comply with the installation circuitry. To assemble the units 12 in the panel 14, the leads 26 are inserted through the holes and the circuit connectors 10 are snapped over the leads with the tongues 24 engaging the leads as shown in Fig. 4. The biting action of the ends 30 of the tongues 24 prevent easy withdrawal and tend to firmly retain the resistor or capacitor in position on the panel. The final phase of assembly is dip soldering the lower surface of the board to permanently secure the electrical connections (not shown).

Figure 7:
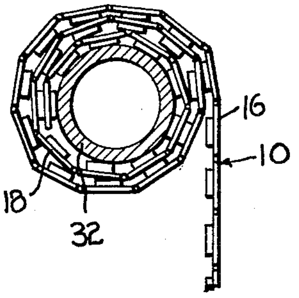
Figure 6:
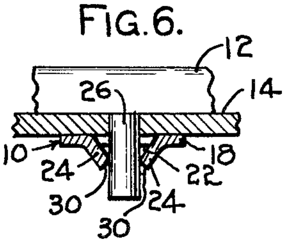
Fig. 6 is a view in section taken on the line 6—6 of Fig. 5.

As shown in Fig. 7, the connector strips may be stored on a reel 32 and cut in sections to meet the circuit requirements.

It can readily be seen that the use of these connectors eliminate the time consuming necessity of stringing wire between the terminals of the electron components and the possibilities of an imperfect electrical contact.

Since certain other obvious modifications may be made in this device without departing from the scope of the invention, it is intended that all matters contained herein be interpreted in an illustrative and not in a limiting sense.

I claim:

An electronic assembly of the class described comprising, in combination, a panel member having apertures therethrough, a plurality of electronic components supported by said panel on one face thereof, said components having terminal leads passing through the apertures in said panel and exposed at the opposite face of said panel and a plurality of electrical conductor connector strips formed from a uniform material and located at the said opposite face of said panel and each strip having a series of apertures, some of which receive terminal leads of the components, said strips having yieldable gripping means at the apertures in said strips and gripping the terminal leads thereby holding the parts of the assembly together and electrically connecting the components one with another, the apertures and gripping means of each strip being relatively closely arranged to adapt a minimum length of strip to any spacing of the terminal leads, thereby allowing the use of uniform connector strip materials varying only as to length.

References Cited in the file of this patent

UNITED STATES PATENTS

| | | |
|---|---|---|
| 2,519,121 | Del Camp | Aug. 15, 1950 |
| 2,613,287 | Geiger | Oct. 7, 1952 |
| 2,757,319 | Kapp | July 31, 1956 |
| 2,772,501 | Malcolm | Dec. 4, 1956 |

FOREIGN PATENTS

| | | |
|---|---|---|
| 255,512 | Great Britain | July 15, 1926 |
| 562,577 | Great Britain | July 7, 1944 |